United States Patent [19]
Kim

[11] Patent Number: 6,064,554
[45] Date of Patent: May 16, 2000

[54] OVERCURRENT PROTECTION CIRCUIT AND METHOD FOR UNIVERSAL SERIAL BUS HUB UNIT

[75] Inventor: Hong-Ki Kim, Kyungki-do, Rep. of Korea

[73] Assignee: SamSung Electronics Co., Ltd., Kyungki-do, Rep. of Korea

[21] Appl. No.: 09/066,538

[22] Filed: Apr. 27, 1998

[30]     Foreign Application Priority Data

Apr. 26, 1997 [KR]  Rep. of Korea ........................ 97-15727

[51] Int. Cl.⁷ ...................................................... H02H 3/00
[52] U.S. Cl. ..................... 361/64; 361/93.1; 395/750.01; 395/200.38
[58] Field of Search ............................... 361/93.1, 62, 63, 361/64, 67, 68; 395/750.01, 750.02, 750.06, 750.07, 200.38; 702/FOR 111

[56]            References Cited

U.S. PATENT DOCUMENTS 5,675,813  10/1997  Holmdahl ............................ 395/750.02

*Primary Examiner*—Ronald W. Leja
*Attorney, Agent, or Firm*—Robert E. Bushnell, Esq.

[57]                ABSTRACT

An overcurrent protection circuit for a universal serial bus (USB) hub unit is comprised of a USB hub controller for controlling the operation of the USB hub unit, a plurality of power switches for switching operating voltages under the control of the USB hub controller respectively, a plurality of power output ports for transferring output voltages from the power switches to the subsequent USB hub units or peripheral devices respectively connected thereto, a plurality of overcurrent detectors respectively connected between the power switches and the power output ports for generating overcurrent detection signals when overcurrent flows to the subsequent USB hub units or peripheral devices, and a plurality of signal transfer/power interruption controllers each for transferring the overcurrent detection signal from a corresponding one of the overcurrent detectors to an input terminal of the USB hub controller and controlling a corresponding one of the power switches in response to a power interruption signal from an output terminal of the USB hub controller to interrupt the supply of power to a corresponding one of the power output ports. According to the invention, only one input terminal and one output terminal of the USB hub controller are used to prevent overcurrent from flowing to the subsequent USB hub units and/or peripheral devices.

18 Claims, 3 Drawing Sheets

OVERCURRENT PROTECTION CIRCUIT AND METHOD FOR UNIVERSAL SERIAL BUS HUB UNIT

This application makes reference to, incorporates the same herein, and claims all benefits accruing under 35 U.S.C. §119 from an application for OVERCURRENT PROTECTION CIRCUIT FOR UNIVERSAL SERIAL BUS HUB UNIT earlier filed in the Korean Industrial Property Office on the Apr. 26$^{th}$ 1997, and there duly assigned Ser. No. 15727/1997, a copy of which application is annexed hereto.

BACKGROUND OF THE INVENTION

1. Technical Field

The present invention relates to a universal serial bus (USB) hub for extending the number of peripheral devices connectable to a computer system, and more particularly, relates to an overcurrent protection circuit for a USB hub unit which is capable of preventing overcurrent from flowing to subsequent USB hub units and/or peripheral devices connected to the USB hub unit.

2. Related Art

Contemporary computer systems generally consist of a main unit (which may have built-in storage devices such as floppy disks, hard disks and CD-ROM), a keyboard and a monitor. The main unit may be connected to a display monitor and many other peripheral devices such as a keyboard, an input mouse, a digital still camera, a modem, a scanner, a telephone and a printer. However, standard computer systems support only a limited number of interface slots. Consequently, only a limited number of peripheral devices can be connected to the computer systems for operation. In addition, many peripheral devices have unique connectors that may not be interchangeable with the computer system, and must be carefully plugged into corresponding connectors of the interface slot of the computer system for operation.

In order to relieve cable congestion and reduce the number of connectors contained in the computer system, a universal serial bus (USB) hub has been proposed to serve as a central connection point of the computer system for power and data distribution to a wide variety of peripheral devices. Multiple sub universal serial bus (USB) hubs may be connected to a main universal serial bus (USB) hub for power and data distribution to as many peripheral devices as desired. While the USB hub permits the computer system to conveniently control power distribution over different peripheral devices. I have observed that there is no effective means to prevent overcurrent from flowing from power output ports of a main universal serial bus (USB) hub to secondary USB hubs and/or peripheral devices connected thereto.

SUMMARY OF THE INVENTION

Accordingly, it is therefore an object of the present invention to provide a universal serial bus (USB) hub arrangement for a computer system.

It is also an object to provide a universal serial bus (USB) hub arrangement for power and data distribution from a computer system to a wide variety of peripheral devices.

It is another object to provide a universal serial bus (USB) hub arrangement with a main USB hub unit connected directly to a computer system, and serving as a central connection point of the computer system for power and data distribution to a wide variety of peripheral devices.

It is yet another object to provide a universal serial bus (USB) hub arrangement with a main USB hub unit connected directly to a computer system, and serving as a central connection point of the computer system for power and data distribution to secondary USB hub units and/or peripheral devices.

It is further an object to provide an overcurrent protection circuit for each universal serial bus (USB) hub unit in a universal serial bus (USB) hub arrangement for preventing overcurrent from flowing to subsequent secondary USB hub units and/or peripheral devices.

These and other objects of the present invention can be achieved by an overcurrent protection circuit for a universal serial bus (USB) hub unit of a computer system which is comprised of a USB hub controller for controlling the operation of the USB hub unit, a plurality of power switches for switching operating voltages under the control of the USB hub controller respectively, a plurality of power output ports for transferring output voltages from the power switches to the subsequent USB hub units or peripheral devices respectively connected thereto, a plurality of overcurrent detectors respectively connected between the power switches and the power output ports for generating overcurrent detection signals when overcurrent flows to the subsequent USB hub units or peripheral devices, and a plurality of signal transfer/power interruption controllers each for transferring the overcurrent detection signal from a corresponding one of the overcurrent detectors to an input terminal of the USB hub controller and controlling a corresponding one of the power switches in response to a power interruption signal from an output terminal of the USB hub controller to interrupt the supply of power to a corresponding one of the power output ports. As a result, only one input terminal and one output terminal of the USB hub controller are used to prevent overcurrent from flowing to the subsequent USB hub units and/or peripheral devices.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
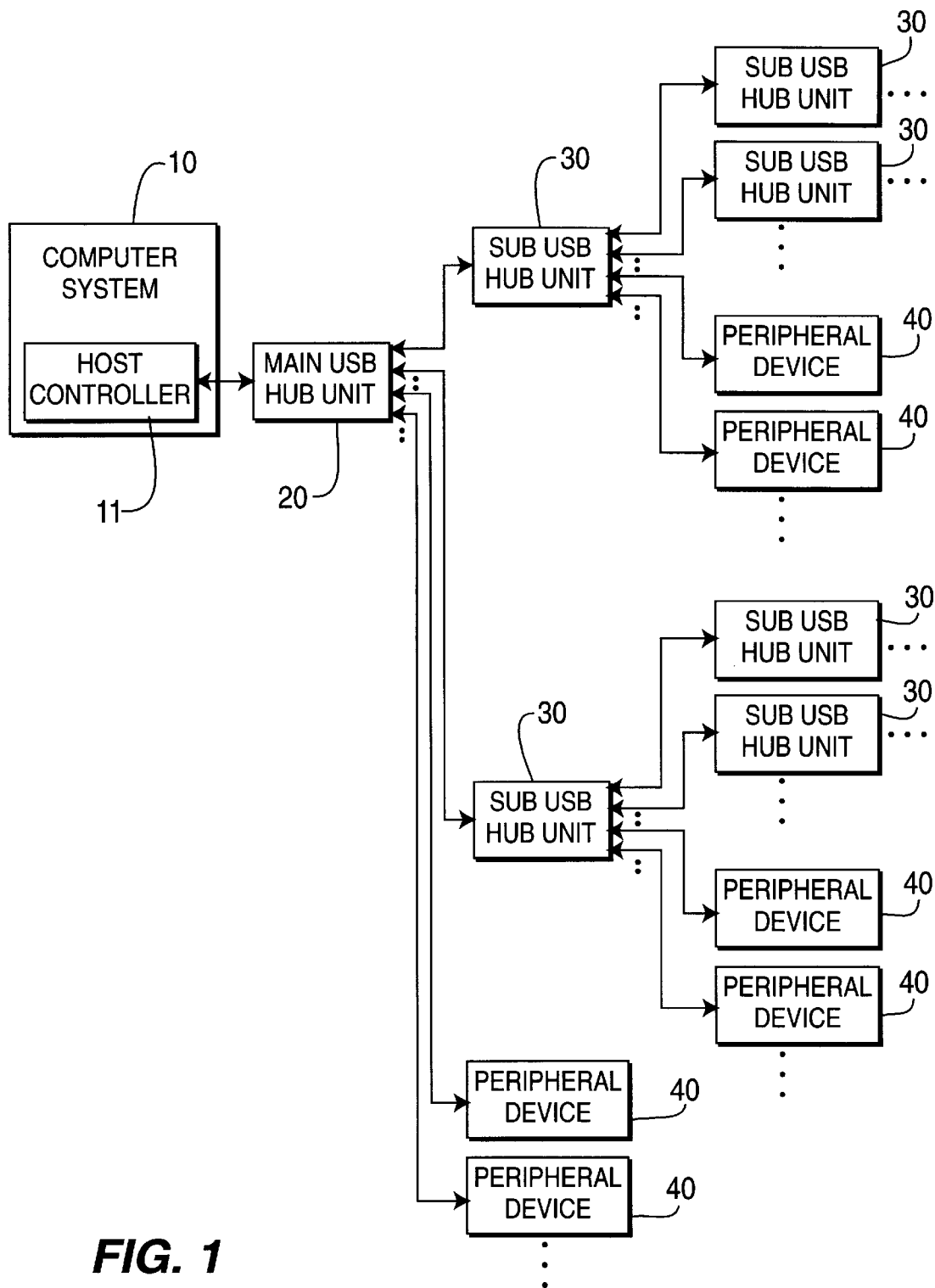
FIG. 1 illustrates a universal serial bus (USB) hub arrangement of a computer system.

Referring now to the drawings and particularly to FIG. 1, which illustrates a universal serial bus (USB) hub arrangement of a computer system. As shown in FIG. 1, the universal serial (USB) hub arrangement includes a main universal serial bus (USB) hub unit 20 connected directly to a host controller 11 of the computer system 10, a plurality of sub or secondary USB hub units 30 connected in series and parallel to the main USB hub unit 20, and a plurality of peripheral devices 40 connected in parallel to each of the main and sub USB hub units 20 and 30. The main USB hub unit 20 may be arranged integrally in a peripheral device 40 which may be a video display monitor, a keyboard, an input mouse, a digital still camera, a modem, a scanner, a telephone and a printer. Alternatively, the main USB hub unit 20 may be arranged separately from the peripheral device 40.

The host controller 11 in the computer system 10 is adapted to process information regarding the connection of each peripheral device 40 and to perform communication between the peripheral device and a central processing unit in the computer system 10. In addition, the host controller 11 limits the connection of additional peripheral devices 40 according to the type thereof and allocates a communication address to additional peripheral devices 40. At this time, if an error occurs in the peripheral device connection, the host controller 11 transfers the associated information to the central processing unit to inform the user of such a situation.

Further, in the case where the connection of the peripheral device 40 is accurately made, the host controller 11 assigns a proper resource to the peripheral device and performs a correct data transfer between the peripheral device 40 and the central processing unit. The number of peripheral devices 40 connectable to the main and sub USB hub units 20 and 30 may be 127 at the maximum. Each of the main and sub USB hub units 20 and 30 is adapted to perform upstream communication and downstream data processing. In other words, upon receiving downstream data from the central processing unit of the computer system 10 sequentially through the host controller 11 and other high-order layers, the main and sub USB hub units 20 and 30 transfer the received downstream data to the associated peripheral devices 40 sequentially through low-order layers. Likewise, upon receiving upstream data from the peripheral devices 40 sequentially through low-order layers, the main and sub USB hub units 20 and 30 transfer the received upstream data to the central processing unit of the computer system 10 sequentially through high-order layers.

The peripheral devices 40 each may be physically located no more than 5 meters away from the main and sub USB hub units 20 and 30, and all constituted no more than 127 in number. An operating voltage of 5 V is supplied downstream to the peripheral devices 40 to prevent a large amount of power consumption. Since the operating voltage is supplied downstream to the peripheral devices 40, each of the main and sub USB hub units 20 and 30 comprises an overcurrent protection circuit which prevents overcurrent from flowing to the low-order USB hub units and peripheral devices 40.

Figure 2:
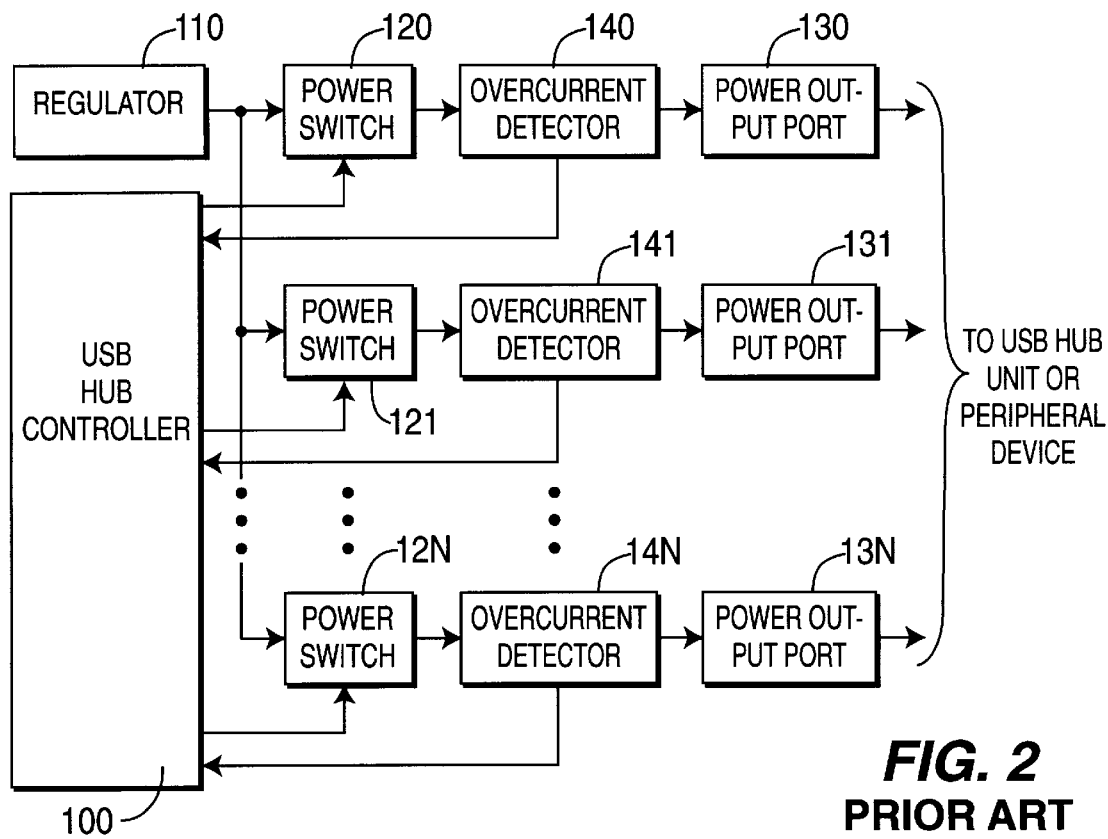
FIG. 2 is a block diagram of an exemplary overcurrent protection circuit for a universal serial bus (USB) hub unit.

FIG. 2 illustrates an exemplary overcurrent protection circuit provided in each of the main and sub USB hub units 20 and 30 of the USB arrangement as shown in FIG. 1. The overcurrent protection circuit comprises a USB hub controller 100 for controlling the operation of the corresponding USB hub unit, a regulator 110 for outputting an operating voltage, power switches 120–12N for switching the output voltage from the regulator 110 under the control of the USB hub controller 100, power output ports 130–13N for transferring output voltages from the power switches 120–12N respectively to the subsequent USB hub units or peripheral devices connected thereto, and overcurrent detectors 140–14N connected respectively between the power switches 120–12N and the power output ports 130–13N, for detecting whether overcurrent flows to the subsequent USB hub units or peripheral devices and informing the USB hub controller 100 of the detected result.

The regulator 110 outputs an operating voltage supplied from a separate power supply circuit in the case where the corresponding USB hub unit is the main USB hub unit 20 connected to the host controller 11 in the computer system 10. However, in the case where the corresponding USB hub unit is the sub USB hub unit 30 connected to the main USB hub unit 20, the regulator 110 outputs an operating voltage supplied from the main USB hub unit 20. In addition, in the case where the corresponding USB hub unit is the sub USB hub unit connected to the high-order sub USB hub unit, the regulator 110 outputs an operating voltage supplied from the high-order USB hub unit.

The operation of the exemplary overcurrent protection circuit of the USB hub arrangement will be described in detail with reference to FIGS. 1 and 2 hereinbelow First, in order to supply the operating voltage to the USB hub units 30 or peripheral devices 40 connected respectively to the power output ports 130–13N, the USB hub controller 100 outputs power supply control signals respectively to the power switches 120–12N. The power switches 120–12N are turned on respectively in response to the power supply control signals from the USB hub controller 100 to pass the output voltage from the regulator 110. Then, the output voltages from the power switches 120–12N are supplied to the subsequent USB hub units 30 or peripheral devices 40, respectively, through the overcurrent detectors 140–14N and power output ports 130–13N.

If overcurrent flows to the USB hub unit 30 or peripheral device 40 connected to the power output port 130 under this condition, then it is detected by the overcurrent detector 140. As a result, the overcurrent detector 140 outputs an overcurrent detection signal to the USB hub controller 100. In response to the overcurrent detection signal from the overcurrent detector 140, the USB hub controller 100 determines that overcurrent flows to the USB hub unit 30 or peripheral device 40 connected to the power output port 130. As a result, the USB hub controller 100 outputs a power interruption signal to the power switch 120 to interrupt the supply of power to the power output port 130.

Likewise, when the overcurrent flows to the USB hub units 30 or peripheral devices 40 connected respectively to the power output ports 131–13N, then it is detected by the overcurrent detectors 141–14N. As a result, the overcurrent detectors 141–14N output overcurrent detection signals respectively to the USB hub controller 100. In response to the overcurrent detection signals from the overcurrent detectors 141–14N, the USB hub controller 100 determines that overcurrent flows to the USB hub units 30 or peripheral devices 40 connected respectively to the power output ports 131–13N. As a result, the USB hub controller 100 outputs power interruption signals respectively to the power switches 121–12N to interrupt the supply of power to the power output ports 131–13N.

However, two terminals of the USB hub controller 100 of the exemplary overcurrent protection circuit of the USB hub unit must be used with respect to each of the power output ports 130–13N. For example, in the case where the power output ports 130—13N are seven in number, the USB hub controller 100 requires seven output terminals for the control of seven power switches and seven input terminals for the input of seven overcurrent detection signals. For this reason, the terminals of the USB hub controller 100 must be increased or reduced in number according to the number of the power output ports 130–13N. This requirement is extremely difficult for circuit designs.

Figure 3:
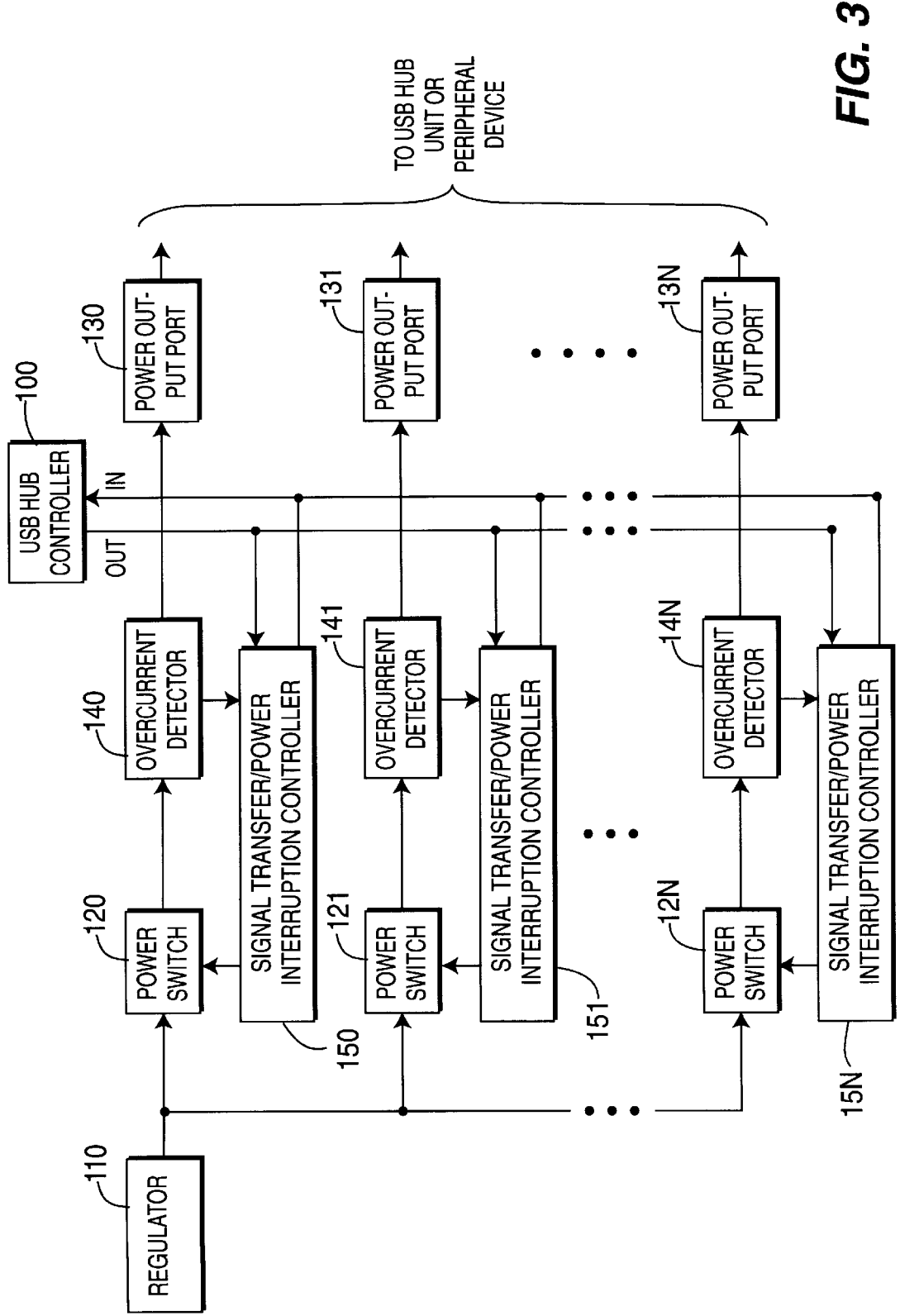
FIG. 3 is a block diagram of an overcurrent protection circuit for a universal serial bus (USB) hub unit constructed according to the principles of the present invention.

Turning now to FIG. 3 which illustrates an overcurrent protection circuit for a USB hub unit constructed according to the principles of the present invention. As shown in FIG. 3, the overcurrent protection circuit includes a USB hub controller 100 for controlling the operation of the corresponding USB hub unit, a regulator 110 for outputting an operating voltage, power switches 120–12N for switching the output voltage from the regulator 110 under the control of the USB hub controller 100, and power output ports 130–13N for transferring output voltages from the power switches 120–12N respectively to the subsequent USB hub units or peripheral devices connected thereto. Overcurrent detectors 140–14N are connected respectively between the power switches 120–12N and the power output ports 130–13N, for detecting whether overcurrent flows to the subsequent USB hub units or peripheral devices and informing the USB hub controller 100 of the detected result. Signal transfer/power interruption controllers 150–15N are connected respectively between the USB hub controller 100, the overcurrent detectors 140–14N and power switches 120–12N. Each of the signal transfer/power interruption controllers 150–15N transfers an overcurrent detection signal from a corresponding one of the overcurrent detectors 140–14N to an input terminal IN of the USB hub controller 100 when overcurrent is detected by the corresponding overcurrent detector. In addition, each of the signal transfer/power interruption controllers 150–15N controls a corresponding one of the power switches 120–12N in response to a power interruption signal from an output terminal OUT of the USB hub controller 100 to interrupt the supply of power to a corresponding one of the power output ports 130–13N.

Figure 4:
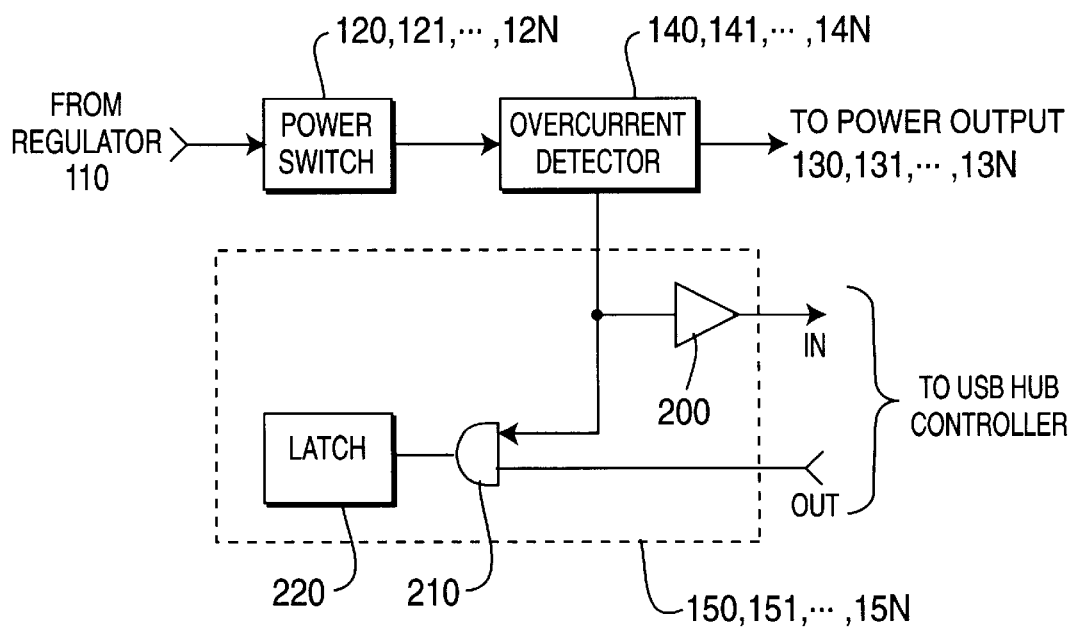
FIG. 4 is a detailed circuit diagram of a signal transfer/power interruption controller of the overcurrent protection circuit of FIG. 3.

FIG. 4 is a detailed circuit diagram of each of the signal transfer/power interruption controllers 150–15N. As shown in FIG. 4, each signal transfer/power interruption controller includes a buffer 200 for transferring the overcurrent detection signal from the corresponding overcurrent detector to the input terminal IN of the USB hub controller 100.

The signal transfer/power interruption controller further includes an AND gate 210 for ANDing the overcurrent detection signal from the corresponding overcurrent detector and the power interruption signal from the output terminal OUT of the USB hub controller 100, and a latch 220 for latching an output signal from the AND gate 210 and outputting the latched signal to the corresponding power switch.

Now, the operation of the overcurrent protection circuit for a USB hub unit according to the principles of the present invention will be described in detail with reference to FIGS. 3 and 4 hereinbelow.

In order to supply the operating voltage to the USB hub units 30 or peripheral devices 40 connected respectively to the power output ports 130–13N, the USB hub controller 100 outputs a power supply control signal of low level at its output terminal OUT. The power supply control signal of low level from the USB hub controller 100 is applied to one input terminal of the AND gate 210 in each of the signal transfer/power interruption controllers 150–15N, the other input terminal of which is applied with the output signal from the corresponding overcurrent detector. As a result, the AND gate 210 outputs a low level signal regardless of the output signal from the corresponding overcurrent detector.

The low level signal from the AND gate 210 is latched by the latch 220 and applied to the corresponding power switch to turn it on. When turned on, the power switches 120–12N pass the output voltage from the regulator 110. Then, the output voltages from the power switches 120–12N are supplied as the operating voltages to the subsequent USB hub units 30 or peripheral devices 40, respectively, through the overcurrent detectors 140–14N and power output ports 130–13N.

If overcurrent flows to the USB hub units 30 or peripheral devices 40 connected respectively to the power output ports 130–13N under the above condition, then it is detected by the overcurrent detectors 140–14N. As a result, the overcurrent detectors 140–14N output overcurrent detection signals of high level. The high level signals from the overcurrent detectors 140–14N are applied to the input terminal IN of the USB hub controller 100 through the corresponding buffers 200. In response to the overcurrent detection signals from the overcurrent detectors 140–14N, the USB hub controller 100 determines that overcurrent flows to the USB hub units 30 or peripheral devices 40 connected respectively to the power output ports 130–13N. As a result, the USB hub controller 100 outputs a power interruption signal of high level at its output terminal OUT.

The high level signal from the USB hub controller 100 is applied to one input terminal of the AND gate 210 in each of the signal transfer/power interruption controllers 150–15N, the other input terminal of which is applied with the high level signal from the corresponding overcurrent detector. As a result, the AND gate 210 outputs a high level signal, which is then latched by the latch 220 and applied to the corresponding power switch to turn it off. When turned off, the power switches 120–12N interrupt the supply of power to the corresponding power output ports 130–13N to prevent overcurrent from flowing to the subsequent USB hub units 30 or peripheral devices 40.

As described above, according to the present invention, only one input terminal and one output terminal of the USB hub controller are used regardless of the number of the power output ports of a USB hub unit to prevent overcurrent from flowing to the subsequent USB hub units and/or peripheral devices. Therefore, the circuit design is simplified regardless of the number of the power output ports.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An overcurrent protection circuit for a universal serial bus hub unit, comprising:

a universal serial bus hub controller for controlling the operation of said universal serial bus hub unit, said universal serial bus hub controller having only one input terminal and only one output terminal for overcurrent protection;

a plurality of power switches for respectively switching an operating voltage under the control of said universal serial bus hub controller;

a plurality of power output ports each for transferring an output voltage respectively from a corresponding one of said plurality of power switches to any of a corresponding subsequent universal serial bus hub unit and any of a corresponding peripheral device respectively connected to a corresponding one of said plurality of power output ports;

a plurality of overcurrent detectors each connected respectively between a corresponding one of said plurality of power switches and a corresponding one of said plurality of power output ports, each of said plurality of overcurrent detectors for generating an overcurrent detection signal when overcurrent flows to any of a corresponding said subsequent universal serial bus hub unit and any of a corresponding said peripheral device connected respectively to a corresponding, one of said plurality of power output ports; and a plurality of signal transfer/power interruption controllers each for respectively transferring said overcurrent detection signal from a corresponding one of said plurality of overcurrent detectors to said only one input terminal of said universal serial bus hub controller and for respectively controlling a corresponding one of said plurality of power switches in response to a power interruption signal from said only one output terminal of said universal serial bus hub controller to interrupt the supply of the output voltage to a corresponding one of said plurality of power output ports.

2. The overcurrent protection circuit of claim 1, further comprised of each of said plurality of signal transfer/power interruption controllers comprising:

a signal transfer unit for transferring said overcurrent detection signal from a corresponding overcurrent detector of said plurality of overcurrent detectors to said only one input terminal of said universal serial bus hub controller; and a power interruption control unit for controlling a corresponding power switch of said plurality of power switches in response to said overcurrent detection signal from the corresponding overcurrent detector and said power interruption signal from said only one output terminal of said universal serial bus hub controller to interrupt the supply of the output voltage to a corresponding power output port of said plurality of power output ports.

3. The overcurrent protection circuit of claim 2, further comprised of said signal transfer unit including a buffer for transferring said overcurrent detection signal from the corresponding overcurrent detector to said only one input terminal of said universal serial bus hub controller.

4. The overcurrent protection circuit of claim 3, further comprised of said power interruption control unit comprising:

an AND gate for ANDing said overcurrent detection signal from the corresponding overcurrent detector and said power interruption signal from said only one output terminal of said universal serial bus hub controller; and a latch for latching an output signal from said AND gate and outputting a latched signal to the corresponding power switch to control interruption of the output voltage to the corresponding power output port.

5. The overcurrent protection circuit of claim 2, further comprised of said power interruption control unit comprising:

an AND gate for ANDing said overcurrent detection signal from the corresponding overcurrent detector and said power interruption signal from said only one output terminal of said universal serial bus hub controller; and a latch for latching an output signal from said AND gate and outputting a latched signal to the corresponding power switch to control interruption of the output voltage to the corresponding power output port.

6. An overcurrent protection circuit for a universal serial bus (USB) hub unit in a universal serial bus (USB) hub arrangement of a computer system, comprising:

a hub controller for controlling the operation of the universal serial bus hub unit, said hub controller having only one input terminal and only one output terminal for overcurrent protection;

a power source for supplying an operating voltage to a plurality of power output ports for power distribution to any of a plurality of secondary universal serial bus hub units and any of peripheral devices respectively connected to a corresponding power output port of said plurality of power output ports;

a plurality of overcurrent detectors each respectively connected to a corresponding power output port of said plurality of power output ports, and each for generating a respective overcurrent detection signal for reception by said only one input terminal of said hub controller when overcurrent flows to any of said plurality of secondary universal serial bus hub units and any of said peripheral devices respectively connected to a corresponding power output port of said plurality of power output ports; and power interruption means for interrupting a supply of the operating voltage to a corresponding power output port of said plurality of power output ports in response to a power interruption signal from said only one output terminal of said hub controller, when said respective overcurrent detection signal from a corresponding overcurrent detector of said plurality of overcurrent detectors is received by said hub controller.

7. The overcurrent protection circuit of claim 6, further comprised of said power interruption means comprising:

a signal transfer unit for transferring said respective overcurrent detection signal from the corresponding overcurrent detector to said hub controller; and a power interruption control unit for interrupting the supply of the operating voltage to the corresponding power output port in response to said power interruption signal from said hub controller.

8. The overcurrent protection circuit of claim 7, further comprised of said signal transfer unit including, a buffer for transferring said respective overcurrent detection signal from the corresponding overcurrent detector to said hub controller.

9. The overcurrent protection circuit of claim 8, further comprised of said power interruption control unit comprising:

an AND gate for ANDing said respective overcurrent detection signal from the corresponding overcurrent detector and said power interruption signal from said hub controller; and a latch for latching an output signal from said AND gate and controlling the interruption of the supply of the operating voltage to the corresponding power output port.

10. The overcurrent protection circuit of claim 7, further comprised of said power interruption control unit comprising:

an AND gate for ANDing said respective overcurrent detection signal from the corresponding overcurrent detector and said power interruption signal from said hub controller; and a latch for latching an output signal from said AND gate and controlling the interruption of the supply of the operating voltage to the corresponding power output port.

11. A universal serial bus hub arrangement, comprising:
a computer system;
a main universal serial bus hub unit connected to said computer system serving as a connection point of the computer system for power and data distribution to any of a plurality of secondary universal serial bus hub units and any of peripheral devices, said main universal serial bus hub unit comprising:
   a hub controller for controlling the operation of said main universal serial bus hub unit, said hub controller having only one input terminal and only one output terminal for overcurrent protection;
   a plurality of power switches for respectively switching an operating voltage under the control of said hub controller;
   a plurality of power output ports each for transferring an output voltage from a corresponding one of said plurality of power switches to any of the secondary universal serial bus hub units and any of the peripheral devices connected respectively to a corresponding, power output port of said plurality of power output ports;
   a plurality of overcurrent detectors each connected respectively between a corresponding one of said plurality of power switches and a corresponding one of said plurality of power output ports, for respectively generating an overcurrent detection signal when overcurrent flows to any of said secondary universal serial bus hub units and any of said peripheral devices connected respectively to a corresponding power output port of said plurality of power output ports; and
   a plurality of signal transfer/power interruption controllers each for respectively transferring said overcurrent detection signal from a corresponding overcurrent detector of said plurality of overcurrent detectors to said only one input terminal of said hub controller and controlling a corresponding power switch of said plurality of power switches in response to a power interruption signal from said only one output terminal of said hub controller to interrupt the supply of the output voltage to a corresponding power output port of said plurality of power output ports.

12. The universal serial bus hub arrangement of claim 11, further comprised of each of said signal transfer/power interruption controllers comprising:
   a signal transfer unit for transferring said overcurrent detection signal from the corresponding overcurrent detector to said hub controller; and
   a power interruption control unit for controlling the corresponding power switch in response to said overcurrent detection signal from the corresponding overcurrent detector and said power interruption signal from said hub controller to interrupt the supply of the output voltage to the corresponding power output port.

13. The universal serial bus hub arrangement of claim 12, further comprised of said signal transfer unit including a buffer for transferring said overcurrent detection signal from the corresponding overcurrent detector to said hub controller.

14. The universal serial bus hub arrangement of claim 13, further comprised of said power interruption control unit comprising:

and AND gate for ANDing said overcurrent detection signal from the corresponding overcurrent detector and said power interruption signal from said hub controller; and
a latch for latching an output signal from said AND gate and outputting a latched signal to the corresponding power switch to control interruption of the output voltage to the corresponding power output port.

15. The universal serial bus hub arrangement of claim 12, further comprised of said power interruption control unit comprising:
   and AND gate for ANDing said overcurrent detection signal from the corresponding overcurrent detector and said power interruption signal from said hub controller; and
   a latch for latching an output signal from said AND gate and outputting a latched signal to the corresponding power switch to control interruption of the output voltage to the corresponding power output port.

16. A method for overcurrent protection in a universal serial bus hub arrangement, comprising the steps of:
   controlling the operation of a universal serial bus hub unit by a universal serial bus hub controller, said universal serial bus hub controller having only one input terminal and only one output terminal for overcurrent protection;
   switching selectively an operating voltage under the control of said universal serial bus hub controller by a plurality of power switches;
   transferring selectively an output voltage by a plurality of power output ports, each of said plurality of power output ports selectively transferring the output voltage from a corresponding one of said plurality of power switches to any of a corresponding subsequent universal serial bus hub unit and any of a corresponding peripheral device respectively connected to a corresponding one of said plurality of power output ports;
   generating selectively an overcurrent detection signal by a plurality of overcurrent detectors, each of said plurality of overcurrent detectors connected respectively between a corresponding one of said plurality of power switches and a corresponding one of said plurality of power output ports so that when overcurrent flows to any of a corresponding said subsequent universal serial bus hub unit and any of a corresponding said peripheral device connected respectively to a corresponding one of said plurality of power output ports said overcurrent detection signal is generated by a corresponding overcurrent detector of said plurality of overcurrent detectors; and
   transferring selectively said overcurrent detection signal by a plurality of signal transfer/power interruption controllers to said only one input terminal of said universal serial bus hub controller, each of said plurality of signal transfer/power interruption controllers respectively transferring said overcurrent detection signal from a corresponding one of said plurality of overcurrent detectors to said only one input terminal of said universal serial bus hub controller and selectively controlling a corresponding one of said plurality of power switches in response to a power interruption signal from said only one output terminal of said universal serial bus hub controller to interrupt the supply of the output voltage to a corresponding one of said plurality of power output ports.

17. A method for overcurrent protection in a universal serial bus hub arrangement of a computer system, comprising the steps of:

controlling the operation of a universal serial bus hub unit by a hub controller, said hub controller having only one input terminal and only one output terminal for overcurrent protection;

supplying selectively an operating voltage from a power source to a plurality of power output ports for power distribution to any of a plurality of secondary universal serial bus hub units and any of peripheral devices respectively connected to a corresponding power output port of said plurality of power output ports;

generating selectively an overcurrent detection signal by a plurality of overcurrent detectors, each of said plurality of overcurrent detectors respectively generating said overcurrent detection signal for reception by said only one input terminal of said hub controller when overcurrent flows to any of said plurality of secondary universal serial bus hub units and any of said peripheral devices respectively connected to a corresponding power output port of said plurality of power output ports to which corresponding power output port a corresponding overcurrent detector is connected; and interrupting a supply of the operating voltage to a corresponding power output port of said plurality of power output ports in response to a power interruption signal from said only one output terminal of said hub controller, when said overcurrent detection signal from a corresponding overcurrent detector of said plurality of overcurrent detectors is received by said hub controller.

18. A method for overcurrent protection in a universal serial bus hub arrangement for a computer system, comprising the steps of:

connecting a main universal serial bus hub unit to a computer system to serve as a connection point of the computer system for power and data distribution to any of a plurality of secondary universal serial bus hub units and any of peripheral devices;

controlling the operation of said main universal serial bus hub unit by a hub controller, said hub controller having only one input terminal and only one output terminal for overcurrent protection;

switching selectively an operating voltage under the control of said hub controller by a plurality of power switches;

transferring selectively an output voltage by a plurality of power output ports, each of said plurality of output ports selecting transferring the output voltage from a corresponding one of said plurality of power switches to any of the secondary universal serial bus hub units and any of the peripheral devices connected respectively to a corresponding power output port of said plurality of power output ports;

generating selectively an overcurrent detection signal by a plurality of overcurrent detectors, each of said plurality of overcurrent detectors connected respectively between a corresponding one of said plurality of power switches and a corresponding one of said plurality of power output ports so that when overcurrent flows to any of said secondary universal serial bus hub units and any of said peripheral devices connected respectively to a corresponding power output port of said plurality of power output ports said overcurrent detection signal is generated by a corresponding overcurrent detector of said plurality of overcurrent detectors to which a corresponding power output port is connected; and transferring selectively said overcurrent detection signal by a plurality of signal transfer/power interruption controllers to said only one input terminal of said hub controller, each of said plurality of signal transfer/power interruption controllers respectively transferring said overcurrent detection signal from a corresponding overcurrent detector of said plurality of overcurrent detectors to said only one input terminal of said hub controller and controlling a corresponding power switch of said plurality of power switches in response to a power interruption signal from said only one output terminal of said hub controller to interrupt the supply of the output voltage to a corresponding power output port of said plurality of power output ports.

\* \* \* \* \*